United States Patent [19]
Zimbone

[11] Patent Number: 4,874,154
[45] Date of Patent: Oct. 17, 1989

[54] ENCAPSULATED SPRING ASSEMBLY FOR RECLINING FURNITURE

[75] Inventor: Paul J. Zimbone, Raynham, Mass.

[73] Assignee: Acushnet Company, New Bedford, Mass.

[21] Appl. No.: 316,549

[22] Filed: Feb. 23, 1989

Related U.S. Application Data

[63] Continuation of Ser. No. 64,333, Jun. 19, 1987, abandoned.

[51] Int. Cl.⁴ .................. F16M 3/00; B60G 11/52
[52] U.S. Cl. .................. 267/140.4; 267/33; 297/DIG. 7
[58] Field of Search .................. 267/33, 34, 131, 135, 267/142, 145, 140.3, 140.4, 150, 166–169, 248, 257, 258, 140, 152, 153, 286, 287, 291, 292, 293, 249; 297/DIG. 1, DIG. 7, 452; 5/246, 248, 253, 256, 261, 481, 475

[56] References Cited

U.S. PATENT DOCUMENTS

| | | | |
|---|---|---|---|
| 1,170,146 | 2/1916 | Gallagher | 267/168 X |
| 1,811,987 | 6/1931 | Wales | 267/291 X |
| 2,118,150 | 5/1938 | Brinkley | 267/169 X |
| 3,795,390 | 3/1974 | Kendall et al. | 267/33 |
| 3,861,661 | 1/1975 | Yazaki | 267/33 |

FOREIGN PATENT DOCUMENTS

| | | | |
|---|---|---|---|
| 0405216 | 10/1924 | Fed. Rep. of Germany | 267/286 |
| 0094142 | 6/1982 | Japan | 267/33 |
| 0514319 | 12/1971 | Switzerland | 5/475 |

Primary Examiner—Robert J. Oberleitner
Attorney, Agent, or Firm—Lucas & Just

[57] ABSTRACT

An improved spring with a compression-type, helical spring in which a dowel member is inserted is disclosed. The dowel member can be a solid metal dowel having a length approximately equal to the length of the spring when fully compressed and having a diameter equal to the internal diameter of the spring. The compression-type, helical spring is preferably an encapsulated spring.

7 Claims, 6 Drawing Sheets

ENCAPSULATED SPRING ASSEMBLY FOR RECLINING FURNITURE

This is a continuation of application Ser. No. 064,333, filed June 19, 1987, now abandoned.

This invention relates to springs and, more particularly, to an improved encapsulated spring that contracts under axial compression and is reinforced with a rigid dowel member to prevent buckling of the spring when the spring is in a compressed state.

Springs are classified by their shape into six major categories. These are flat or leaf springs, helical, spiral, torsion bar, disk and constant force springs.

Helical springs are essentially a bar or wire of uniform cross section which has been wound into a helix. When a helical spring is intended for use as a resistance against compression-type forces, the helix is loosely wound so that there is space between each coil, and the last turn or two at each end of the spring is modified to a plane surface which is perpendicular to the axis of the spring. When the helical spring is intended for use as a resistance against extension-type force, the helix is tightly wound so that there are no spaces between coils and, generally, the spring has hooks at each end.

An encapsulated spring is a hybrid of the compression-type, helical spring and the constant force spring. The encapsulated spring is a compression-type, helical spring that has been encapsulated with a polymeric material, typically polyurethane. An encapsulated spring provides a constant force during periods of compression and expansion of the compression-type, helical spring.

Encapsulated springs are especially useful in furniture where it is desirable to have a resisting force during periods of movement of the various parts of the furniture piece such as arms and backs.

Ideally, when a compression-type, helical spring is fully compressed, each of the coils is in contact with its immediately adjacent coils so that the spring forms, essentially, a continuous cylinder from one end of the spring to the other without any of the coils overlapping any other coil in the axial direction of the spring.

Typically, these compression-type springs have an effective length. The term "effective length" as used in the instant specification and claims means the axial length of the spring when the spring has been compressed to the minimum length at which the spring was intended to operate. Such an effective length is generally greater than the length of the spring when fully compressed and shorter than the length of the spring without a compression force acting thereon, i.e. at rest.

A problem associated with these compression-type helical springs is that, during periods of compression, and especially when the compression force is such that the spring is near its effective length or when the spring is near the point of being fully compressed, the spring tends to buckle or bulge so that the spring is no longer compressed along its helical axis. When these compression-type, helical springs buckle, the compression force of the spring is greatly reduced and the spring no longer functions properly.

To alleviate the buckling problem, it has been suggested to replace the buckling spring with one that has a lower aspect ratio, i.e. height to outer diameter width. A drawback to such a solution is that more space is required for the wider spring. Where space is at a premium, and especially in the manufacture of reclining furniture where the trend has been to make slimmer, more compact reclining mechanisms in the furniture, using a wider spring is not an acceptable solution.

Applicant has now discovered an improved compression-type, helical spring that resists buckling during periods of compression. In fact, applicant has learned quite surprisingly that by using the spring of the present invention, larger outer diameter, conventional, compression-type, helical springs can be replaced with smaller outer diameter springs of the present invention, and that the smaller outer diameter springs of the present invention function substantially equivalently to the larger conventional springs.

Broadly, the spring of the present invention comprises: a compression-type helical spring having at least a portion of its internal area hollow and a dowel member inserted in said hollow area. The dowel member prevents the compression-type, helical spring from buckling during periods of compression.

Preferably, the dowel member is a rigid dowel that is rounded on at least one end and more preferably at both ends to allow the spring to ride smoothly over the dowel member as the spring is compressed. The rounded edges aid in preventing the spring from becoming "hung-up" on the rigid dowel member.

The cross-sectional width of the rigid dowel member is, preferably, substantially equal to the internal diameter of the spring so that there is a slight interference between the rigid dowel member and the spring. This slight interference allows the rigid dowel member to be securely held in the spring and helps prevent slippage of the dowel.

Also preferably, the length of the rigid dowel member is no greater than the effective length of the spring and more preferably the rigid dowel member is substantially equal to the maximum compression length of the spring when the spring is fully compressed.

These and other advantages of the present invention may be more fully understood with reference to the drawings wherein.

Figure 1:
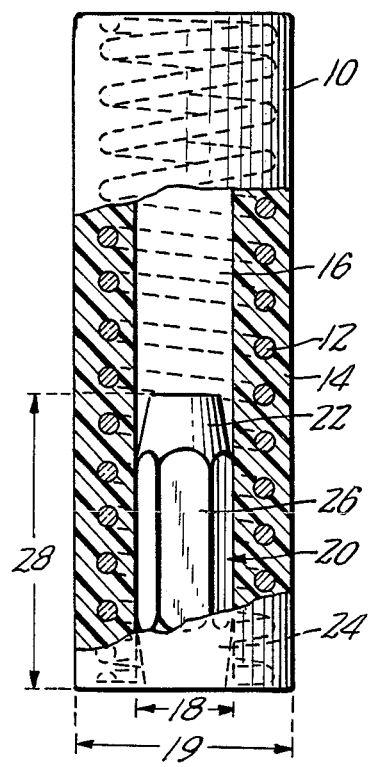
FIG. 1 illustrates a preferred embodiment of the present invention wherein a rigid dowel member is inserted inside an encapsulated spring.

FIG. 1 illustrates encapsulated spring 10 having metal, compression-type, helical spring 12 encapsulated by polyurethane 14. Inside of encapsulated spring 10 a hollow area 16 exists having an internal diameter 18, and outer diameter 19. A rigid dowel member 20 is inserted in hollow area 16. Rigid dowel member 20 is tapered at both ends 22 and 24. The main body 26 of rigid dowel member 20 is hexagonal in cross-section. The overall length 28 of rigid dowel member 20 is substantially equal to the length of encapsulated spring 10 when fully compressed.

Figure 2:
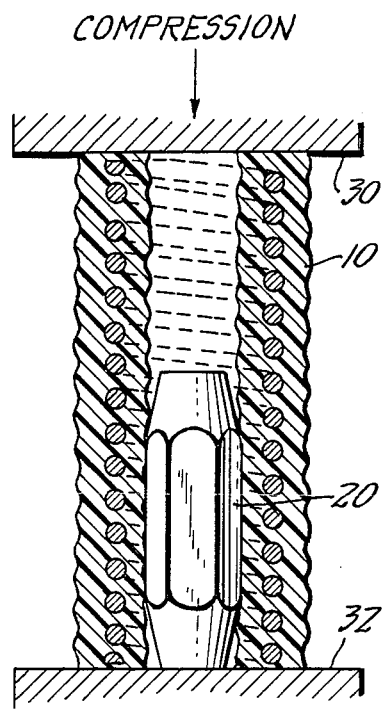
FIG. 2 illustrates the reinforced spring of FIG. 1 partially compressed.

FIG. 2 illustrates encapsulated spring 10 partially compressed and illustrates how spring 10 rides down over rigid dowel member 20 and how rigid dowel member 20 prevents spring 10 from buckling. Also illustrated are plates 30 and 32 which seal the ends of the encapsulated spring 10 and help to prevent dowel member 20 from working itself free during repeated cycles of compression and expansion. Typically, when the improved spring of the present invention is used in furniture, it will have a plate at each end of the spring such as plates 30 and 32 at each end of encapsulated spring 10 in FIG. 2.

Figure 3:
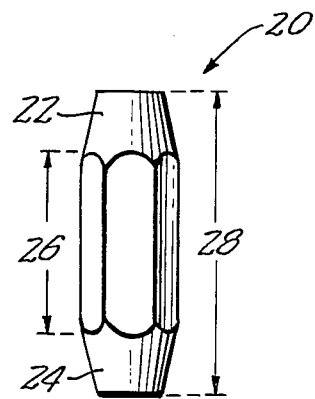
FIG. 3 illustrates the rigid dowel member of FIG. 1.

FIG. 3 illustrates a rigid dowel member 20 apart from encapsulated spring 10. Rigid dowel member 20 has tapered ends 22 and 24 and a main body 26 which is hexagonally shaped.

Figure 4:
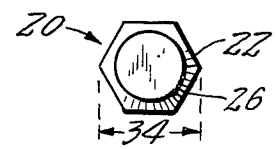
FIG. 4 illustrates a top view of the rigid dowel member of FIG. 3.

FIG. 4 illustrates a top view of rigid dowel member 20 of FIG. 3. The overall diameter 34 of rigid dowel member 20 is shown. The hexagonal shape of main body 26 is also apparent. Tapered section 22 is also apparent. It is preferred that overall diameter 34 of rigid dowel member 20 be substantially equal to internal diameter 26 of encapsulated spring 10 as shown in FIGS. 1 and 2.

It is evident that rigid dowel member 20 shown in FIGS. 1-4 resists the force placed on it when spring 10 buckles and thereby maintains spring 10 in a proper posture.

Figure 5:
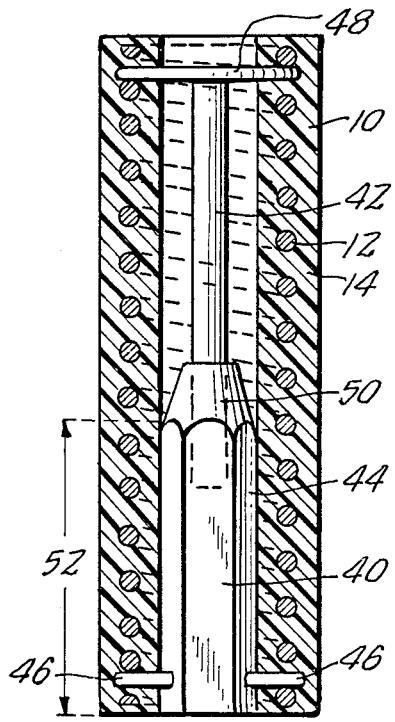
FIG. 5 illustrates yet another preferred embodiment of the present invention wherein the dowel member is a telescoping dowel member.

FIG. 5 illustrates another embodiment of the present invention with encapsulated spring 10 having compression-type, helical spring 12 encapsulated in polyurethane 14. Dowel member 40 is telescoping so that upper member 42 slides into housing 44. Housing 44 is attached to encapsulated spring 10 by means of shoulders 46. Upper member 42 is attached to encapsulated spring 10 by means of plate 48 which is attached to upper member 42.

It is apparent that as spring 10 moves up and down upper member 42 slides into and out of lower member 44. Lower member 44 has a tapered top 50 and main body 52 of lower member 44 is hexagonal in shape. Tapered head 50 allows spring 10 to ride smoothly over lower member 44 during periods of compression. The shoulders 46 ensure that lower member 44 remains in the lower part of spring 10. The plate 48 ensures that upper member 42 follows the spring movements. It can be seen that dowel member 40 resists the force placed on it when spring 10 buckles and thereby maintains spring 10 in a proper posture.

Figure 6:
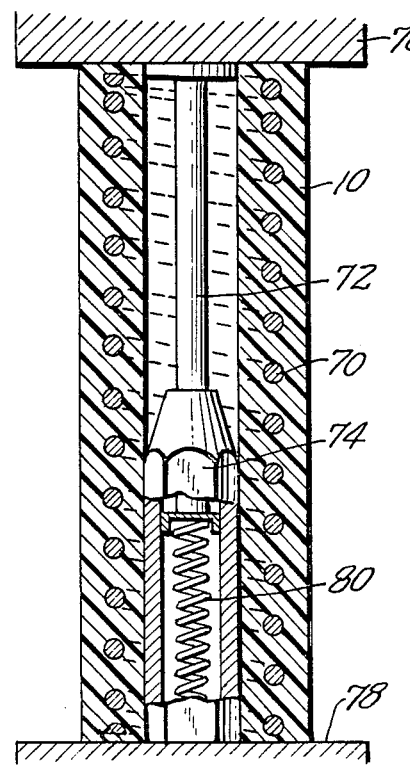
FIG. 6 is still yet another embodiment of the present invention where a spring means is contained within the dowel member.

FIG. 6 illustrates yet another embodiment of the present invention wherein spring 10 has telescoping dowel member 70 consisting of upper member 72 and lower member 74. Spring 10 is sealed at both ends by plates 76 and 78. Inner spring means 80 is housed inside lower dowel member 74. Inner spring means 80 is shown as a conventional compression-type, helical spring. Upper dowel member 42 rests on inner spring 80. As in FIG. 2, plates 76 and 78 represent plates at each end of the spring when the spring is used in a reclining mechanism of reclining furniture.

As spring 10 moves along its helical axis during periods of compression and expansion, upper dowel member 72 moves into and out of lower dowel member 74. Inner spring means 80 forces upper dowel member 72 to abut against upper plate 76.

Inner spring means 80 can be of such a strength that it merely causes upper dowel member 72 to follow spring 10 or it can be such that inner spring means 80 actually assists in preventing compression and thereby aids in resisting the force provided to compress and expand spring 10.

Figure 7:
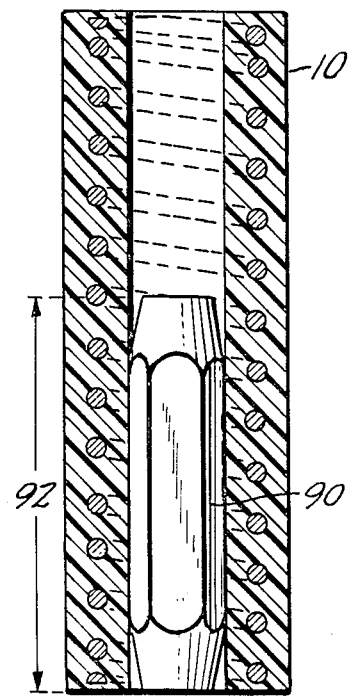
FIG. 7 illustrates a preferred embodiment of the present invention where the length of the rigid dowel member is no greater than the effective length of the spring.

Spring means 80 can be any conventional spring such as a compression-type, helical coil spring or an encapsulated spring. It is readily apparent to one of skill in the art that inner spring means 80 could be a conventional hydraulic type arrangement with upper and lower dowel members 72 and 74 making a conventional hydraulic cylinder. It can be seen that dowel member 70 resists the force placed on it when spring 10 buckles and thereby maintains spring 10 in a proper posture FIG. 7 illustrates yet another preferred embodiment of the present invention wherein spring 10 has rigid dowel member 90 inserted therein. Rigid dowel member 90 has an overall length 92 equal to the effective length of spring 10. The rigid dowel member in FIG. 7 acts not only as a means to prevent the spring from buckling but also as a means to limit the compression of the spring and, with respect to reclining furniture, acts as a means to limit the movement of the specific part of the furniture that utilizes the improved spring of the present invention.

It can be seen that the dowel member 90 resists the force placed on it when spring 10 buckles and thereby maintains spring 10 in a proper posture.

The compression-type, helical spring of the present invention includes: metal, compression-type, helical springs; elastomeric, compression-type, tube springs; and encapsulated springs. The preferred spring is an encapsulated, metal, helical spring as shown in FIGS. 1-2, and 5-7. Preferably, the encapsulated spring of the present invention is encapsulated in polyurethane.

The spring used in the present invention must have a hollow area inside of itself for the placement of the dowel member of the present invention. Such a hollow area, as is typical of metal, compression-type, helical springs and encapsulated springs, may extend throughout the interior of the spring. Preferably, the hollow area extends throughout the interior of the spring.

The dowel member of the present invention is inserted into the hollow area inside the spring.

The outer diameter of the dowel member is no greater than the internal diameter of the spring. Preferably, the outer diameter of the rigid dowel member is substantially equal to the internal diameter of the spring. When the outer diameter of the rigid dowel member is substantially equal to the internal diameter of the spring, the rigid dowel member is securely held in the inside hollow area of the spring.

The external cross-sectional shape of the dowel can be hexagonal, square, circular, or any shape which fits inside said hollow area. Preferably a hexagonal shape is used with the rigid dowel member. The hexagonal shape when used in an encapsulated spring has been found not to cut the encapsulating polyurethane when it is compressed and to allow some expansion of the polyurethane.

Preferably, at least one end of the rigid dowel member is rounded and more preferably both ends of the rigid dowel member are rounded. Good results have been obtained by tapering both ends of the dowel member as shown in FIGS. 1-4 and 7. The rounding of the edges of the rigid dowel member alleviates the possibility of catching by the spring during periods of compression.

The axial length of the rigid dowel member is preferably no greater than the effective length of the spring and more preferably substantially equal to the axial length of the spring when fully compressed. The rigid dowel member can be longer than the length of the spring when the spring is at rest, however, a longer rigid dowel member will protrude from the spring. Such a situation is generally unacceptable in furniture.

The rigid dowel member may be made from any rigid material such as plastic, metal or wood. A metal material is preferred.

The rigid dowel member may be hollow or a solid mass. A solid mass is preferred.

In order to avoid the rigid dowel member from working itself free of the spring, it is preferred that both ends of the spring be sealed. This can be done by merely ensuring that both ends of the spring are against solid stops such as are shown in FIG. 2. Alternatively, the ends may be sealed by other means such as tape.

These and other aspects of the present invention may be more fully understood with reference to the following example.

EXAMPLE 1

This examples illustrates the synergistic results obtained when using the improved spring made in accordance with the present invention. Table 1 below shows the dimensions of the three springs tested and the results obtained therefrom.

TABLE 1

| Spring | Compression Force | Results |
| --- | --- | --- |
| Encapsulated, 1" O.D.* | ¾ compressed | No buckle |
|  | Fully compressed | No buckle |
| Encapsulated, ⅜" O.D. | ¾ compressed | Buckled |
|  | Fully compressed | Buckle worsened |
| Encapsulated, ⅜" O.D. with rigid dowel member therein (Present Invention) | ¾ compressed | No buckle |
|  | Fully compressed | No buckle |

*O.D. is outside diameter

Each encapsulated spring had an overall length of 2½ inches when uncompressed. The metal dowel insert in the ⅜ inch spring of the present invention had an overall length of about 1 inch and a width across its main body of about 5/16 inch. The dowel used in this example was hexagonal in cross section with both ends tapered as shown in FIG. 3. Wire used to make the 1 inch spring was a flat wire with a total of 8 coils, 6 coils being active coils. The wire was about 0.06 inches thick and about 0.21 inches wide. The ⅜ inch spring was a standard ⅜ inch spring sold by Dieco Company and labelled M-123. The ⅜ inch springs had a total of 15 coils, 13 of which were active coils.

The material used to encapsulate the wire springs in this example was polyurethane.

It will be understood that the claims are intended to cover all changes and modifications of the preferred embodiments of the invention herein chosen for the purpose of illustration which do not constitute a departure from the spirit and scope of the invention.

What is claimed is:

1. In reclining furniture having a reclining mechanism for providing resistance during periods of movement of said reclining furniture wherein a spring assembly is used in said reclining mechanism to provide said resistance, the improvement in said spring assembly comprising: an encapsulated helical spring, encapsulated in a polymeric material to provide constant force during periods of compression and expansion of said helical spring in said reclining mechanism of said reclining furniture, said encapsulated helical spring having a hollow internal area, said hollow internal area having an inner diameter, said encapsulated spring having an effective length; and a rigid dowel member inserted in said hollow internal area, said rigid dowel member having an outer diameter substantially equal to the inner diameter of said hollow internal area, said rigid dowel member having a length no greater than the effective length of said encapsulated spring.

2. The encapsulated spring assembly of claim 1 wherein said polymeric material is polyurethane.

3. The encapsulated spring assembly of claim 1 wherein each end of said rigid dowel member is tapered.

4. The encapsulated spring assembly of claim 1 wherein said rigid dowel member has an external cross-sectional shape of a hexagon.

5. The encapsulated spring assembly of claim 1 wherein said rigid dowel member has a telescoping dowel member mounted in said rigid dowel member.

6. The encapsulated spring assembly of claim 1 wherein the rigid dowel member is substantially equal to the length of the spring when the spring is fully compressed.

7. The encapsulated spring assembly of claim 6 wherein said polymeric material is polyurethane and each end of said dowel member is tapered.

* * * * *